US011855419B2

(12) United States Patent
Wu

(10) Patent No.: US 11,855,419 B2
(45) Date of Patent: Dec. 26, 2023

(54) RELAY MODULE STRUCTURE

(71) Applicants: DINKLE ENTERPRISE CO., LTD., New Taipei (TW); DINKLE ELECTRIC MACHINERY (CHINA) CO., LTD., Jiangsu (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Jiangsu (CN)

( * ) Notice: Subject to any disclaimer, the term of this patent is extended or adjusted under 35 U.S.C. 154(b) by 274 days.

(21) Appl. No.: 17/535,409

(22) Filed: Nov. 24, 2021

(65) Prior Publication Data
US 2023/0163576 A1 May 25, 2023

(51) Int. Cl.
*H02B 1/056* (2006.01)
(52) U.S. Cl.
CPC .................................. *H02B 1/0565* (2013.01)
(58) Field of Classification Search
CPC ...... H01H 50/04; H01H 50/048; H01H 50/02; H02B 1/0565; H01R 13/633; H01R 9/2633; H01R 9/26; H01R 13/6273; H01R 9/2625; H01R 13/432; H01R 13/631; H01R 13/6335; H01R 31/06; H01R 4/2433; H01R 4/36; H01R 4/363; H01R 4/48275; H01R 9/16; H01R 9/2408; H01R 9/2641; H01R 9/265; H01R 9/2675; H05K 7/14; H05K 7/1468; H05K 7/1474
See application file for complete search history.

(56) References Cited

U.S. PATENT DOCUMENTS

| 10,355,411 B2 * | 7/2019 | Wu ................... H01R 13/6273 |
| 2004/0087215 A1 | 5/2004 | Pohl et al. | |
| 2012/0088394 A1 * | 4/2012 | Dreier ............... H01R 4/48275 |
| | | | 439/370 |

(Continued)

FOREIGN PATENT DOCUMENTS

| DE | 202011002019 U1 | 4/2011 |
| DE | 202017101346 U1 | 6/2018 |
| DE | 102018109861 A1 | 10/2019 |

(Continued)

OTHER PUBLICATIONS

Search Report dated May 6, 2022 of the corresponding European patent application No. 21211796.4.

*Primary Examiner* — Abhishek M Rathod
(74) *Attorney, Agent, or Firm* — Chun-Ming Shih; HDLS IPR SERVICES

(57) ABSTRACT

The disclosure is a relay module structure. A relay includes a main body and multiple pins connected to the main body. A loading box includes a box body receiving the main body and a flexible latch portion connected to the box body. The box body has a force exerting portion and multiple slots. The pins project from the slots. A relay seat includes a seat body having a recess, a positioning portion, and terminal holes. The loading box is inserted in the recess by engagement between the flexible latch portion and the positioning portion. The pins are inserted in the terminal holes. The flexible latch portion is separated from the positioning portion by exerting a force on the force exerting portion to make the loading box separate from the relay seat.

11 Claims, 7 Drawing Sheets

(56) References Cited

U.S. PATENT DOCUMENTS

| | | | |
|---|---|---|---|
| 2022/0278487 A1* | 9/2022 | Schrafl | H01R 13/6273 |
| 2023/0146590 A1* | 5/2023 | Schaper | H05K 7/14 |
| | | | 439/712 |

FOREIGN PATENT DOCUMENTS

| | | | |
|---|---|---|---|
| DE | 102019133578 A | * | 6/2021 |
| WO | 2021116131 A1 | | 6/2021 |

* cited by examiner

RELAY MODULE STRUCTURE

BACKGROUND

Technical Field

The disclosure relates to a relay, particularly to a thin-type relay structure.

Related Art

A switching of electric signals of an electronic circuit may be controlled by using a relay module for the transmission of electric signals. Also, the related-art compact relay module is usually installing a relay into a relay seat with a handle structure. When the relay is being separated from the relay seat, toggling the handle atop the relay seat can eject the relay from the relay seat to take the relay out.

However, the handle structure of the related-art relay module is hard to be toggled and causes inconvenience in using. In addition, when the relay is assembled in the relay seat, the metal pins are hard to be aligned with and inserted into terminal holes of the relay seat. That causes difficulty in assembling. Therefore, how to improve the usage of the relay module and simplify the assembling process is the purpose of the disclosure.

In view of this, the inventors have devoted themselves to the above-mentioned related art, researched intensively and cooperated with the application of science to try to solve the above-mentioned problems.

SUMMARY

An object of the disclosure is to provide a relay module structure, which improves the use of a relay module and simplifies the assembling process.

To accomplish the above object, the disclosure is a relay module structure, which includes a relay, a loading box, and a relay seat. The relay includes a main body and multiple pins connected to the main body. The loading box includes a box body receiving the main body and a flexible latch portion connected to the box body. The box body has a force exerting portion and multiple slots. The pins project from the slots. The relay seat includes a seat body. The seat body has a recess, a positioning portion, and multiple terminal holes. The positioning portion and the terminal holes are disposed in the recess. The loading box is inserted in the recess by engagement between the flexible latch portion and the positioning portion. The pins projecting from the slots are inserted in the terminal holes. The flexible latch portion is separated from the positioning portion by exerting an external force on the force exerting portion of the box body to make the loading box receiving the relay separate from the relay seat.

In comparison with the related art, the relay module structure of the disclosure receives the relay in the loading box and is connected in the relay seat. The loading box includes a flexible latch portion, and the flexible latch portion may be flexibly deformed by an externally-exerted force. Also, the relay module allows a screwdriver to reach the force exerting portion of the loading box to make the flexible latch portion of the loading box be flexibly deformed so as to be separated from the positioning portion and the relay seat. This increases convenience in using. In addition, the relay module structure of the disclosure omits a handle structure to reduce the overall height, simplify the assembling structure and improve utility in using.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
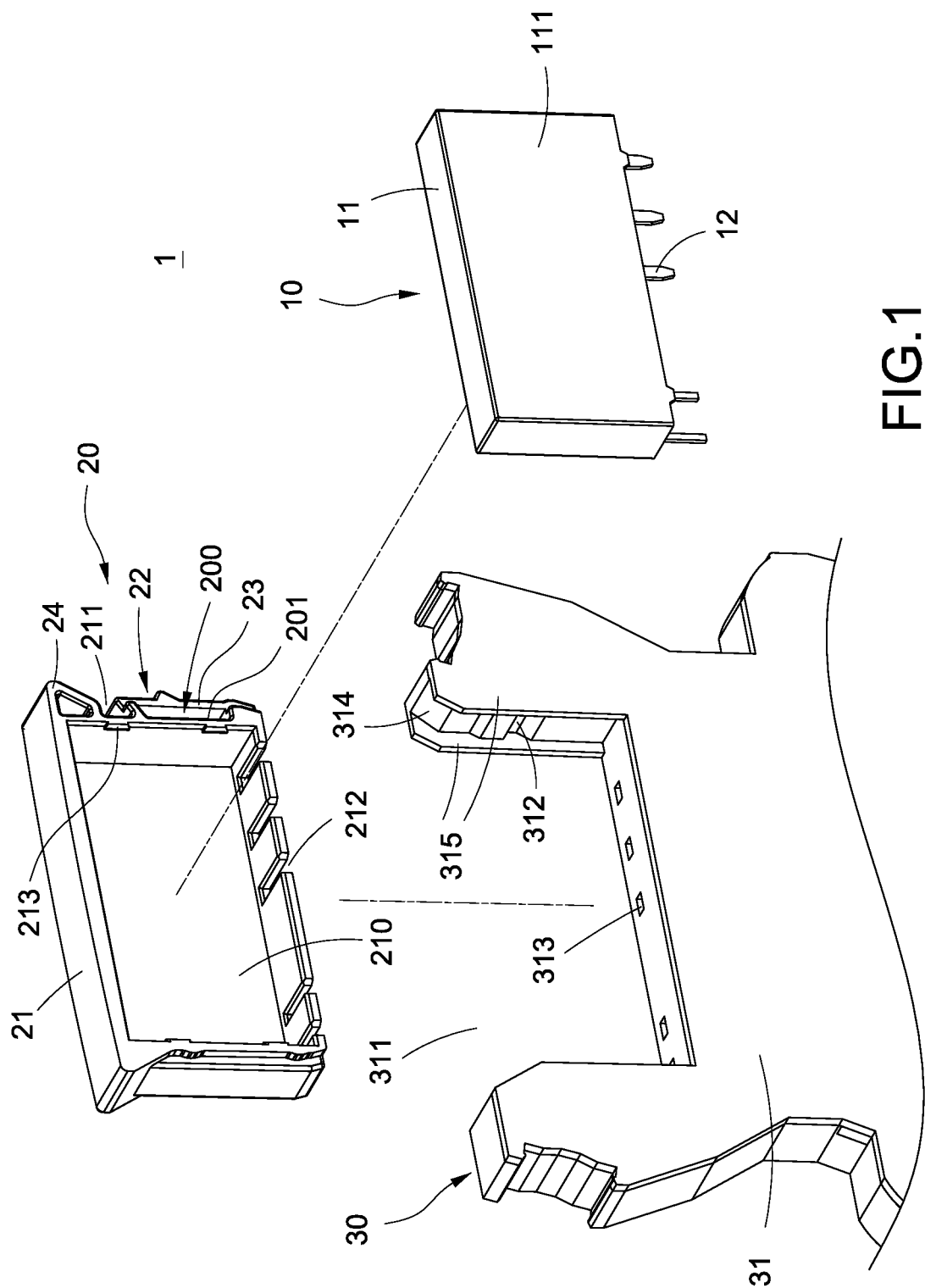
FIG. 1 is an exploded view of the relay module structure of the disclosure.
Figure 2:
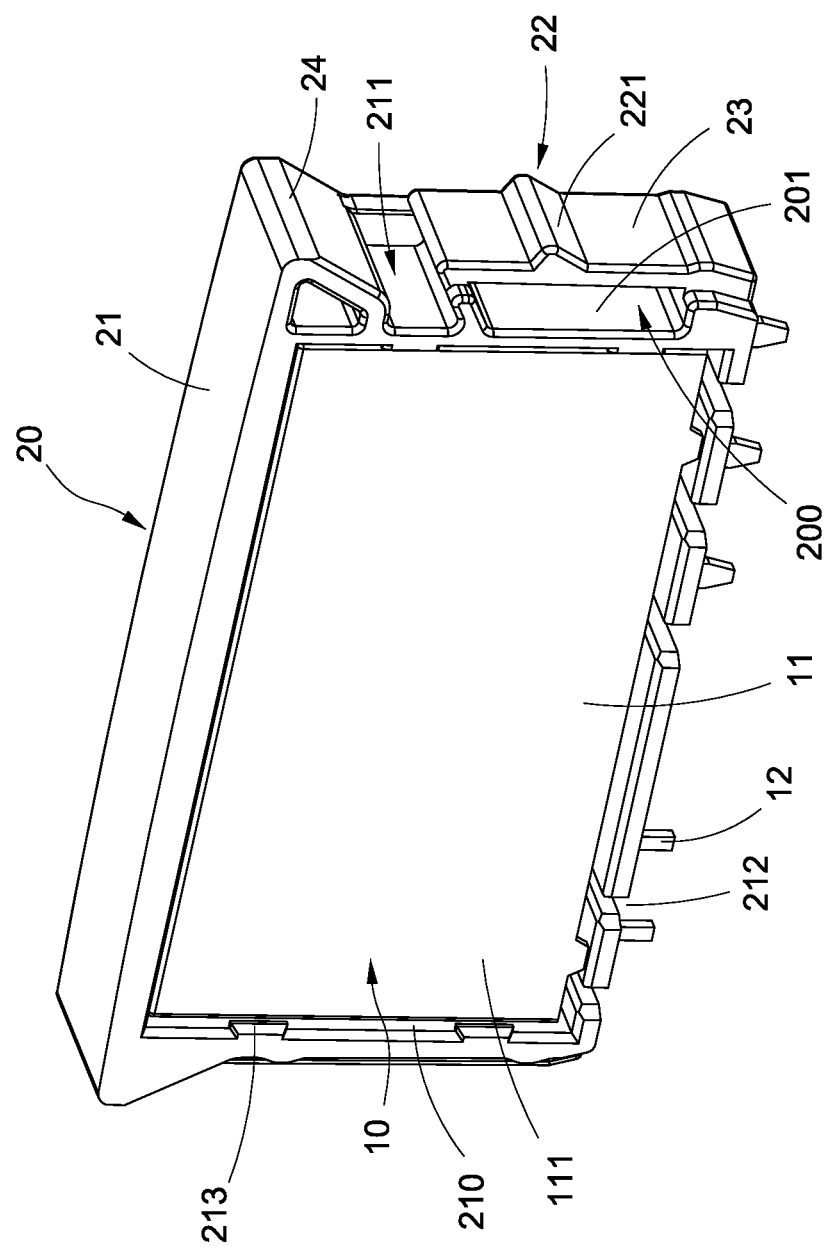
FIG. 2 is an assembled view of the relay and the loading box of the disclosure.
Figure 3:
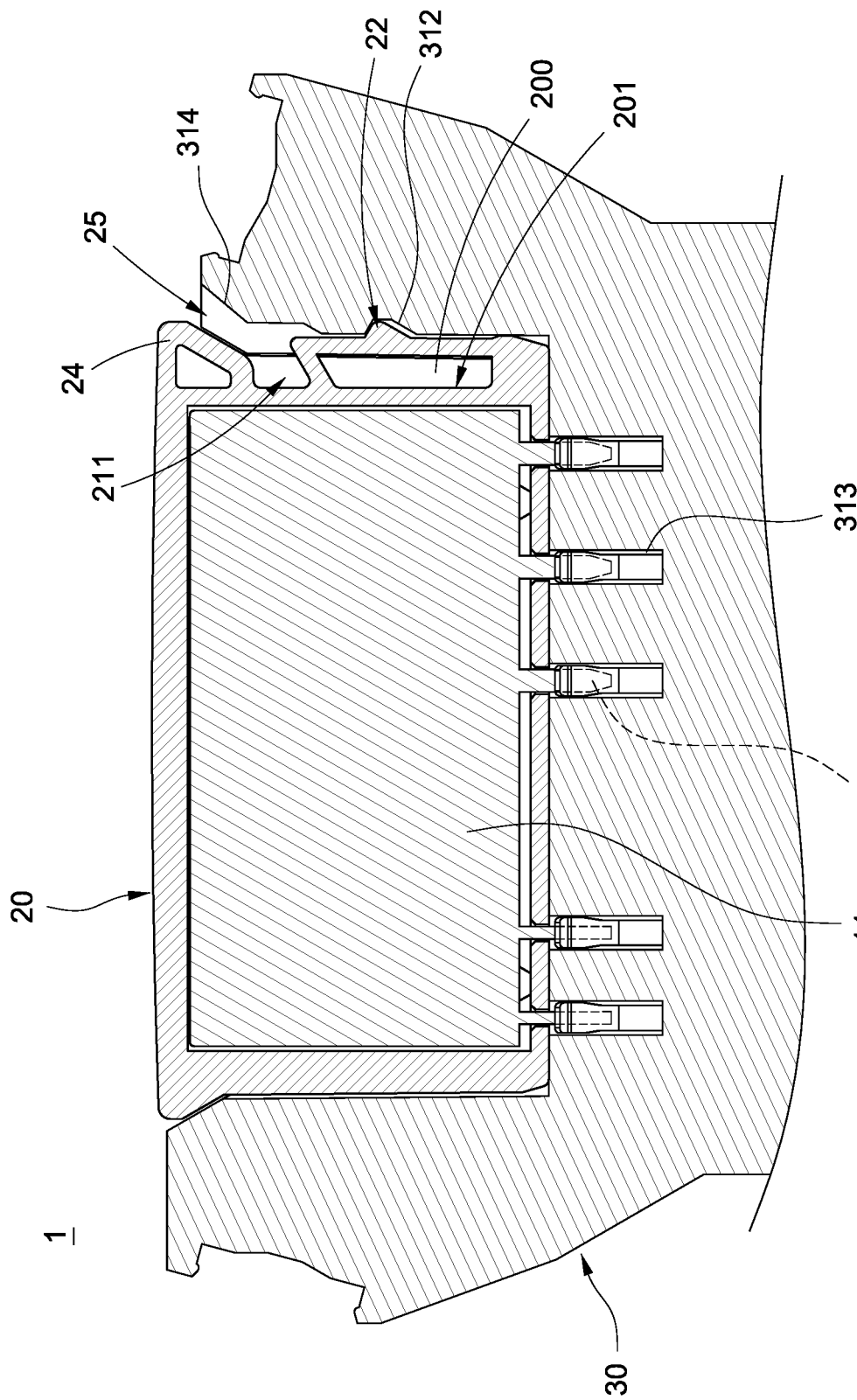
FIG. 3 is a cross-sectional view of the relay module structure of the disclosure.

Please refer to FIGS. 1-3, which are an exploded view of the relay module structure, an assembled view of the relay and the loading box and a cross-sectional view of the relay module structure of the disclosure. The disclosure is a relay module structure 1, which includes a relay 10, a loading box 20 and a relay seat 30. The relay 10 is received in the loading box 20 and connected in the relay seat 30 through the loading box 20 so as to constitute the relay module structure 1. The detailed description of the relay module structure 1 is described below.

The relay 10 includes a main body 11 and multiple pins 12 connected to the main body 11. In the embodiment, the pins 12 are disposed spacedly on the bottom of the main body 11.

The loading box 20 includes a box body 21 for receiving the main body 11 and a flexible latch portion 22 connected to the box body 21. The flexible latch portion 22 may be flexibly deformed by an externally-exerted force. The box body 21 has a force exerting portion 211 and multiple slots 212. The main body 11 is received in the box body 21. The pins 12 project from the slots 212.

In detail, the box body 21 is formed with a flexible arm 23 on an outer surface 201. A flexible space 200 is defined between the flexible arm 23 and the outer surface 201. The flexible latch portion 22 is located on the flexible arm 23. In addition, the outer surface 201 of the box body 21 is formed with a protrusion 24 over the flexible latch portion 22. An engaging trough 25 is defined between the protrusion 24 and the flexible latch portion 22. In some embodiments, the top of the protrusion 24 is flush with the top of the box body 21. In the embodiment, the force exerting portion 211 is located on the bottom of the protrusion 24 and forms an indent, but not limited thereto.

In the embodiment, the main body 11 has two marking surfaces 111 opposite to each other. The box body 21 has two openings 210 opposite to each other. The main body 11 is received in the box body 21 and the two marking surfaces 111 are exposed from the two openings 210. The two marking surfaces 111 may be disposed with markings such as characters or icons (patterns) for recognition or description.

The relay seat 30 includes a seat body 31. The seat body 31 has a recess 311, a positioning portion 312 and multiple terminal holes 313. The positioning portion 312 and the terminal holes 313 are disposed in the recess 311. The loading box 20 is inserted into the recess 311 by engagement between the flexible latch portion 22 and the positioning portion 312. The pins 12 projecting from the slots 212 of the box body 21 are inserted into the terminal holes 313.

In the embodiment, the flexible latch portion 22 includes a hook, and the positioning portion 312 is a notch. In addition, the seat body 31 has a slant trough 314 adjacent to the engaging trough 25. Also, the seat body 31 is formed with a guide sheet 315 on an edge of the recess 311. As a result, the loading box 20 may be inserted into the recess 311 along the guide sheet 315.

In addition, the box body 21 is disposed with multiple latching blocks 213 for latching the relay seat 30 to prevent the relay seat 30 from escaping from the loading box 20.

Figure 4:
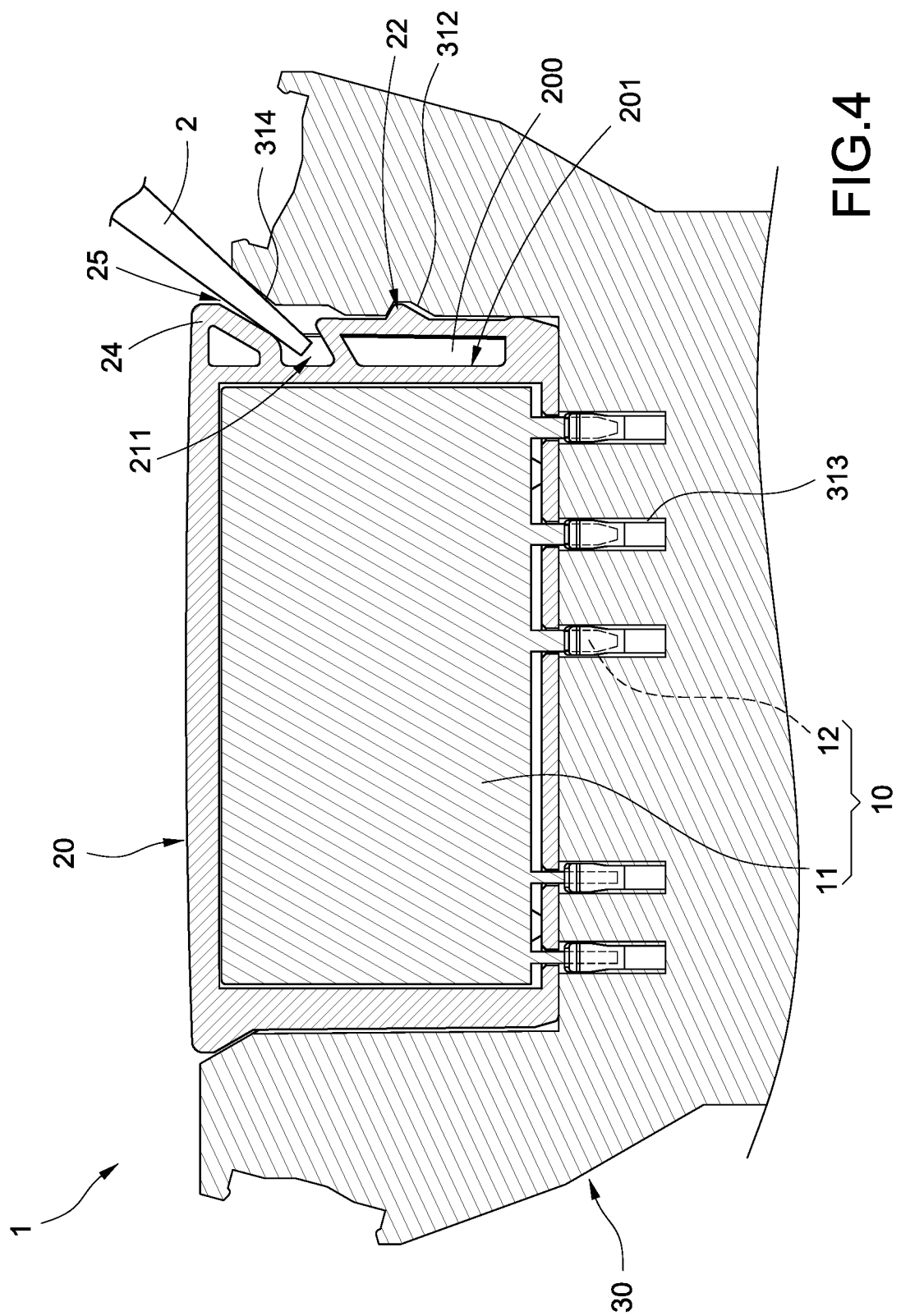
FIG. 4 is a schematic view of the relay module structure of the disclosure with a screwdriver being inserted thereto.
Figure 5:
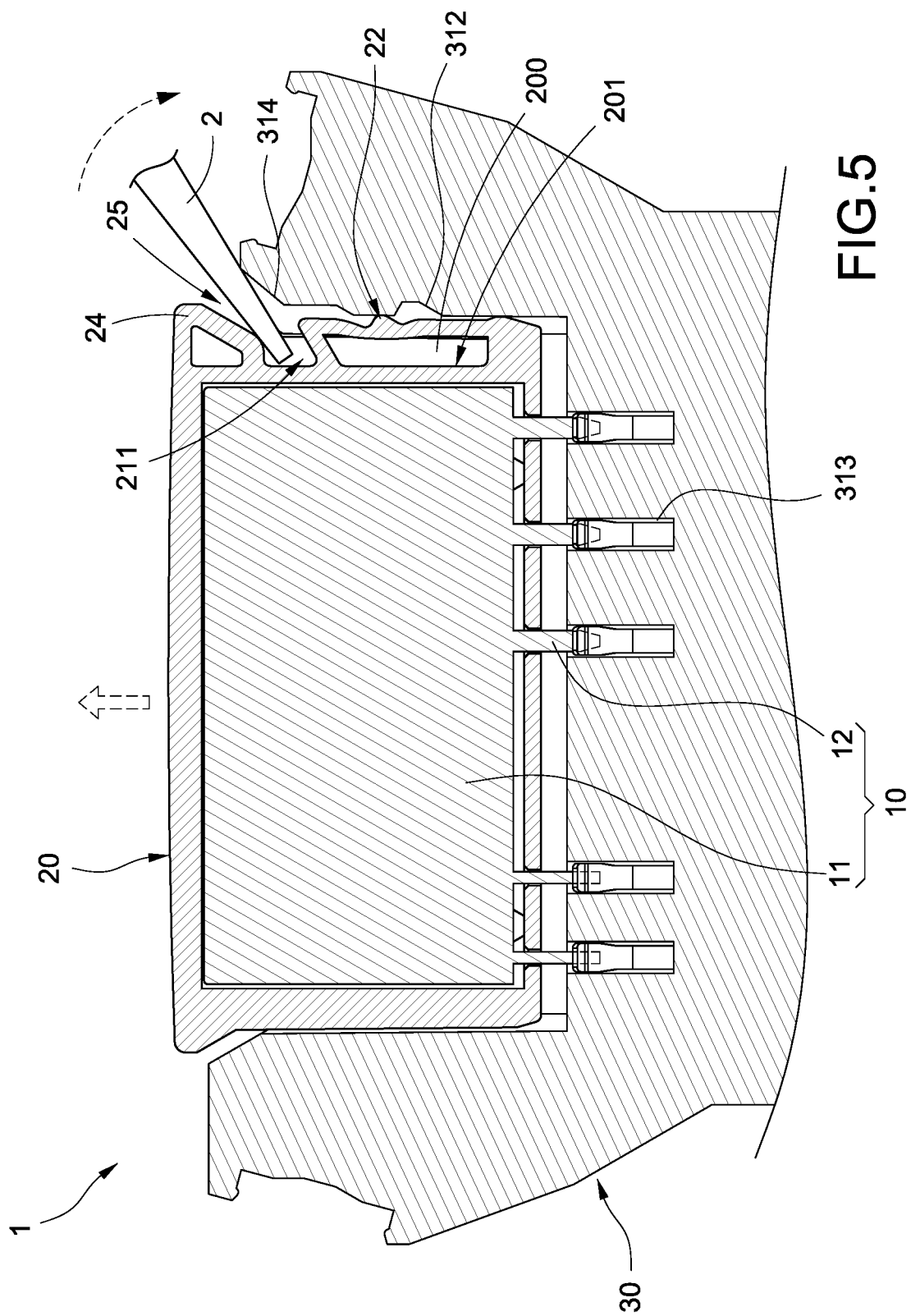
FIG. 5 is a schematic view of the relay module structure of the disclosure with the screwdriver being operated thereon.
Figure 6:
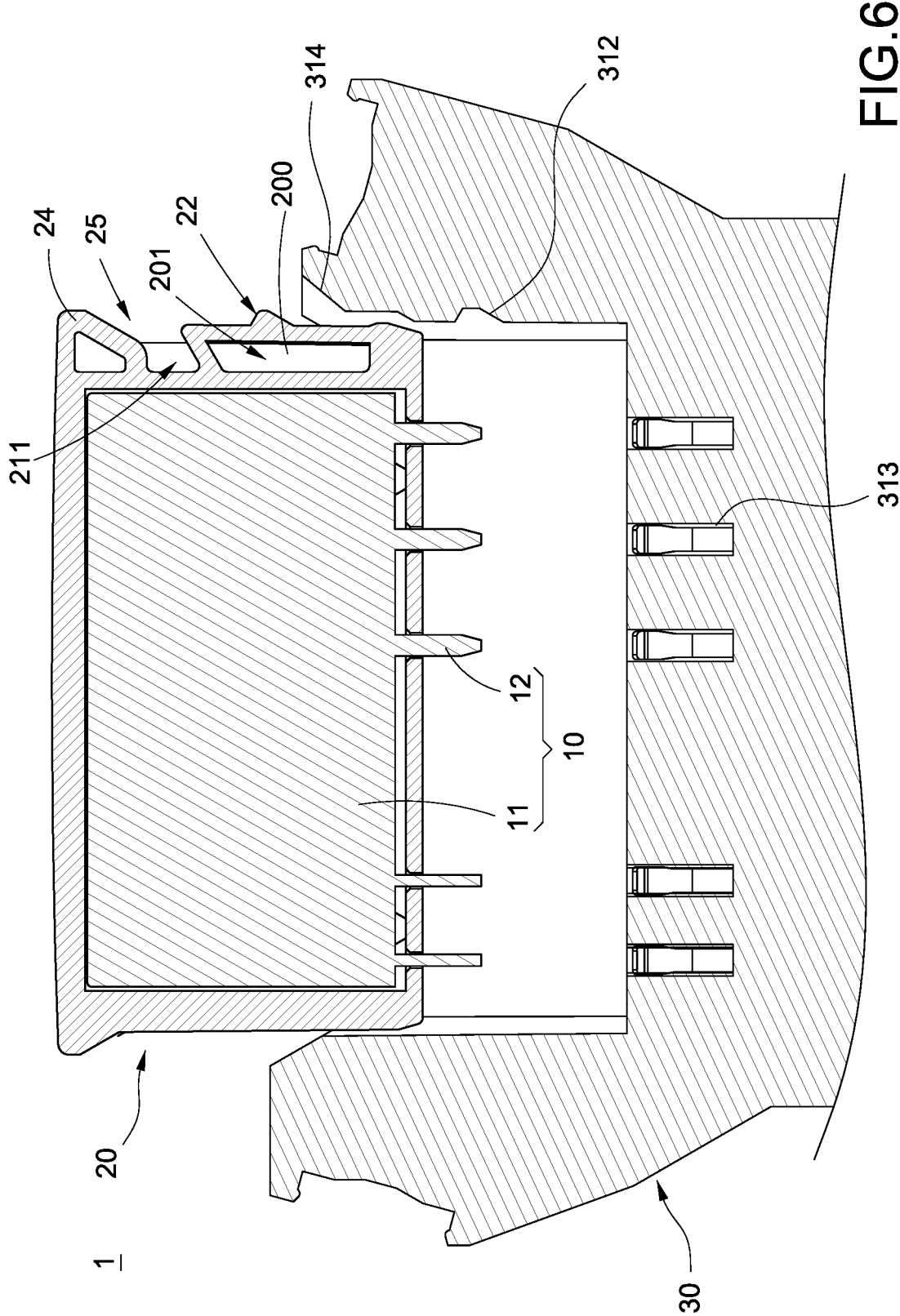
FIG. 6 is a schematic view of separation of the loading box and the relay seat of the disclosure.

Please refer to FIGS. 4-6, which are a schematic view of the relay module structure of the disclosure with a screwdriver being inserted thereto, a schematic view of the relay module structure of the disclosure with the screwdriver being operated thereon and a schematic view of separation of the loading box and the relay seat of the disclosure. The relay module structure 1 of the disclosure may be inserted by a screwdriver 2 and exerted with a force on the loading box 20 to separate the loading box 20 from the relay seat 30.

When using, the screwdriver 2 is inserted into the engaging trough 25 along the slant trough 314 of the seat body 31 and reaches the force exerting portion 211. Thus, the flexible latch portion 22 of the loading box 20 is flexibly deformed by an externally-exerted force on the force exerting portion 211 of the box body 21 to be separated from the positioning portion 312. As a result, the loading box 20 receiving the relay 10 is separated from the relay seat 10.

Figure 7:
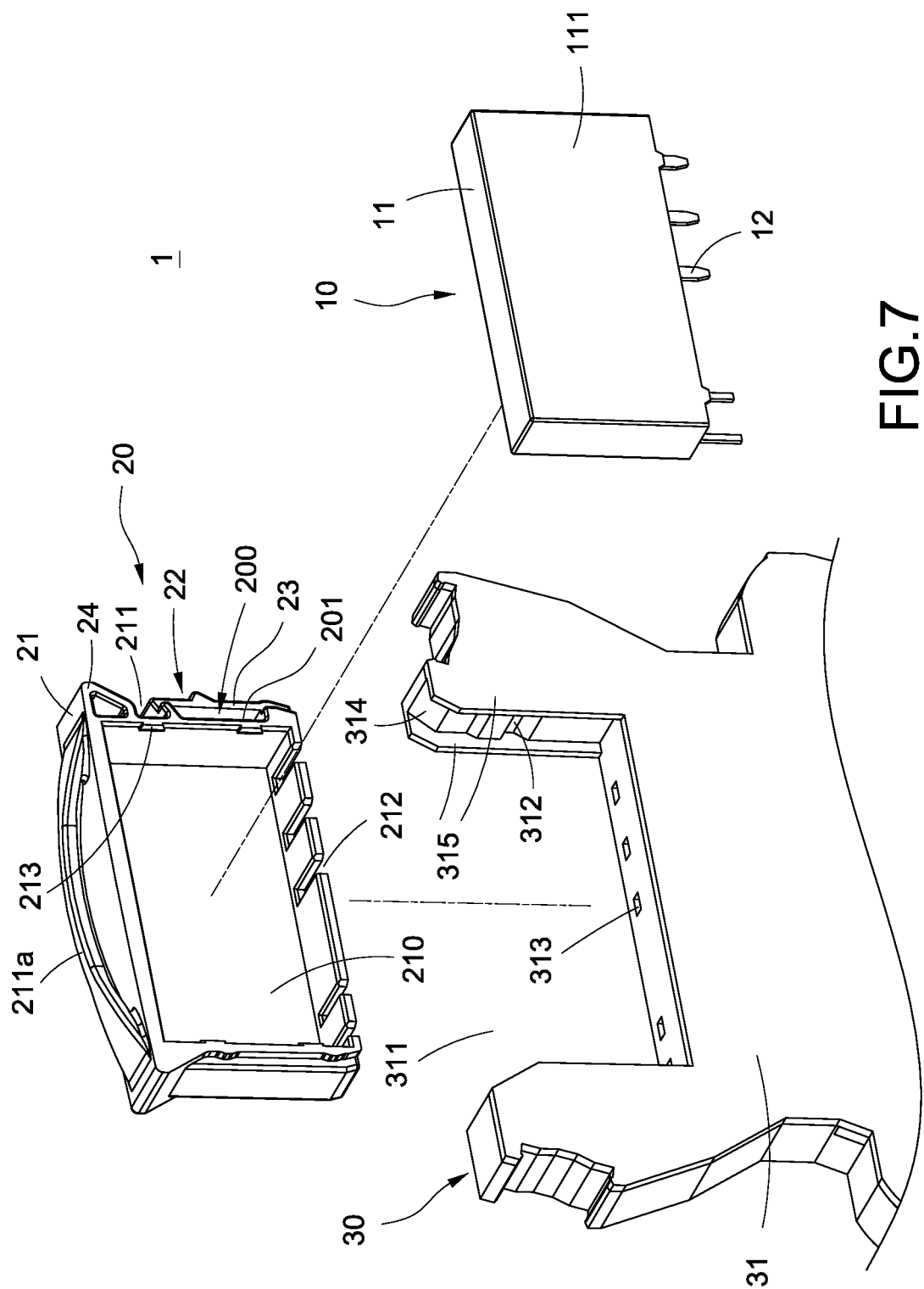
FIG. 7 is an exploded schematic view of another embodiment of the relay module structure of the disclosure.

Please FIG. 7, which is an exploded schematic view of another embodiment of the relay module structure of the disclosure. This embodiment is similar to the above embodiment. The difference therebetween is that the box body 21 is additionally disposed with a handle 211a. The handle 211a is located on the top of the box body 21 and exposed from the relay seat 30. As a result, a user may hold the handle 211a and exert a force to make the flexible latch portion 22 of the loading box 20 be flexibly deformed and be separated from the positioning portion 312 so as to separate the loading box 20 from the relay seat 30.

While this disclosure has been described by means of specific embodiments, numerous modifications and variations could be made thereto by those skilled in the art without departing from the scope and spirit of this disclosure set forth in the claims.

What is claimed is:

1. A relay module structure comprising:
   a relay, comprising a main body and multiple pins connected to the main body;
   a loading box, comprising a box body receiving the main body and a flexible latch portion connected to the box body, the box body comprising a force exerting portion and multiple slots, and the pins projecting from the slots; and
   a relay seat, comprising a seat body, the seat body comprising a recess, a positioning portion and multiple terminal holes, the positioning portion and the terminal holes disposed in the recess, the loading box disposed in the recess by engagement between the flexible latch portion and the positioning portion, and the pins projecting from the slots inserted in the terminal holes;
   wherein the flexible latch portion is separated from the positioning portion by exerting an external force on the force exerting portion of the box body to make the loading box receiving the relay separate from the relay seat.

2. The relay module structure of claim 1, wherein the main body comprises two marking surfaces opposite to each other, the box body comprises two openings opposite to each other, the main body is received in the box body, and the two marking surfaces are exposed from the two openings.

3. The relay module structure of claim 1, wherein the seat body comprises a guide sheet disposed on an edge of the recess.

4. The relay module structure of claim 1, wherein the box body comprises a flexible arm disposed on an outer surface thereof, and a flexible space is defined between the flexible arm and the outer surface.

5. The relay module structure of claim 4, wherein the flexible latch portion is located on the flexible arm.

6. The relay module structure of claim 5, wherein the flexible latch portion comprises a hook and the positioning portion comprises a notch.

7. The relay module structure of claim 1, wherein the box body comprises a protrusion disposed over the flexible latch portion on an outer surface thereof, and an engaging trough is defined between the protrusion and the flexible latch portion.

8. The relay module structure of claim 7, wherein a top of the protrusion is flush with a top of the box body.

9. The relay module structure of claim 7, wherein the seat body comprises a slant trough adjacent to the engaging trough for a screwdriver to be inserted.

10. The relay module structure of claim 7, wherein the force exerting portion is located on a bottom of the protrusion in an indent manner.

11. The relay module structure of claim 1, wherein a handle is disposed on a top of the box body, and the handle is exposed from the relay seat.

* * * * *